US006756575B2

(12) United States Patent
Tadano et al.

(10) Patent No.: US 6,756,575 B2
(45) Date of Patent: Jun. 29, 2004

(54) ABERRATION DETECTING METHOD, OPTICAL RECORDING AND REPRODUCTION METHOD USING THEREOF, AND OPTICAL RECORDING AND REPRODUCTION APPARATUS

(75) Inventors: Hiroyuki Tadano, Kitakatsuragi-gun (JP); Ikuo Nakano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 10/142,501

(22) Filed: May 10, 2002

(65) Prior Publication Data

US 2002/0166945 A1 Nov. 14, 2002

(30) Foreign Application Priority Data

May 11, 2001 (JP) ....................................... 2001-142390

(51) Int. Cl.$^{7}$ ................................................ G02B 27/64
(52) U.S. Cl. ................................. 250/201.5; 369/44.26
(58) Field of Search ........................... 250/201.1, 201.4, 250/201.5; 369/44.26, 44.32

(56) References Cited

U.S. PATENT DOCUMENTS 4,866,688 A * 9/1989 Ohtake et al. ........... 369/44.13
5,161,139 A * 11/1992 Inoue et al. ............. 369/44.23
5,978,332 A * 11/1999 Itakura et al. ........... 369/44.32
6,498,330 B1 * 12/2002 Yoshida ................... 250/201.5
6,510,111 B2 * 1/2003 Matsuura ................. 369/44.32

FOREIGN PATENT DOCUMENTS

JP 182254/2000 6/2000 ............ G11B/7/09

* cited by examiner

*Primary Examiner*—David Porta
*Assistant Examiner*—Patrick J. Lee
(74) *Attorney, Agent, or Firm*—David G. Conlin; John J. Penny, Jr.; Edwards & Angell, LLP

(57) ABSTRACT

An aberration detecting method of the present invention is arranged such that a light beam, having passed through an optical convergence system provided in an optical pickup device, illuminates a flat section of an optical disk, and using the light beam which has been reflected, and the aberration occurring in the two-element objective lens is detected.

14 Claims, 6 Drawing Sheets

6
55
9
52
54
5
4
64
10
53
62
1
2
63
3
7, 8
SECOND ELEMENT DRIVE CIRCUIT
58
FOCUS DRIVE CIRCUIT
57
TRACKING DRIVE CIRCUIT
61
SPINDLE MOTOR DRIVE CIRCUIT
56
CONTROL SIGNAL GENERATION CIRCUIT
59
DATA REPRODUCTION CIRCUIT
60
51
REPRODUCTION SIGNAL

ABERRATION DETECTING METHOD, OPTICAL RECORDING AND REPRODUCTION METHOD USING THEREOF, AND OPTICAL RECORDING AND REPRODUCTION APPARATUS

FIELD OF THE INVENTION

The present invention relates to an aberration detecting method for detecting an aberration occurring in a optical convergence system in an optical pickup device, an optical recording and reproduction method using the aberration detecting method, and an optical recording and reproduction apparatus.

BACKGROUND OF THE INVENTION

There has been a requirement of an optical disk having greater recording density in proportion to the increase of in the volume of information. The recording density of optical disks has been increased by increasing the linear recording density and narrowing the pitch of tracks. To increase the recording density of optical disks as above, it is necessary to reduce the beam diameter of light beam converging on a information recording layer of the optical disk.

Possible methods to reduce the beam diameter of the light beam are such as: increasing a numerical aperture (NA) of light beam projected from an objective lens as an optical convergence system in the optical pickup device which records and reproduces in and from optical disks; and shortening the wavelength of the light beam converged on the information recording layer of the optical disk.

It is considered that shortening the wavelength of the light beam can be realized by switching the light source from a red semiconductor laser to a violet semiconductor laser, the latter brought into full-scale commercial production in a reasonably short time.

Meanwhile, one of the proposed methods to realize an objective lens having large numerical aperture is to incorporate a hemispherical lens into the objective lens so as to constitute the objective lens by two lenses (two groups of lenses).

An optical disk is generally arranged such that an information recording layer is covered by a cover glass for resisting dust and scratches. Thus after passing through the objective lens of the optical pickup device, the light beam passes through the cover glass and then converges on the information recording layer under the cover glass so as to come into a focus.

When the light beam is passing through the cover glass, a spherical aberration (SA) occurs. The spherical aberration SA is indicated as:

$$SA \propto d \cdot NA^4 \quad (1)$$

so that the spherical aberration SA is proportional to the thickness d of the cover glass and the fourth power of the NA of the objective lens. Generally, the objective lens is designed to cancel out the spherical aberration so that the spherical aberration of the light beam having passed through the objective lens and the cover glass is small enough.

However, when the thickness of the cover glass is different from a predetermined value, the light beam converging on the information recording layer has the spherical aberration so that the beam diameter becomes large, and hence writing and reading of the information cannot be properly done.

Moreover, the equation (1) shows that the larger the error Δd of the thickness of the cover glass is, the larger the error ΔSA of the spherical aberration is, and thus proper writing and reading of the information is impaired.

Also, for the sake of increasing the density of recorded information in the direction of the thickness of an optical disk, a multilayer optical disk formed by depositing information recording layers such as, for instance, a DVD (Digital Versatile Disk) having two information recording layers is created so as to have already been commercially available. The optical pickup device for recording and reproducing in and from this kind of multilayer optical disk has to be arranged such that the light beam converges at a sufficiently small point in each of the information recording layers of the optical disk.

In the above-identified multilayer optical disk, the distance from the surface of the disk (surface of the cover glass) to the information recording layer is different in each of the layers so that the extent of the spherical aberration, which occurs when the light beam passes through the cover glass of the optical disk, is also different in each of the layers. For instance, the difference (error ΔSA) of the spherical aberration between neighboring information recording layers is proportional to an interlayer distance t (equivalent to d) between the neighboring information recording layers, according to the equation (1).

In the DVD having two information recording layers, the NA of the objective lens of the optical pickup device is only around 0.6, thus according to the equation (1), it is understood that a not-so-great amount of the error Δd of the thickness of the cover glass causes little influence on the error ΔSA of the spherical aberration.

Thus, in a conventional DVD device using the optical pickup device with the NA around 0.6, the error ΔSA of the spherical aberration caused by the error Δd of the thickness of the cover glass is small so that the light beam converges at a sufficiently small point in each of the information recording layers.

However, provided that the error Δd of the thickness of the cover glass is consistent, the more the NA increases, the greater the error of the spherical aberration SA becomes. For instance, the spherical aberration SA when the NA is 0.85 is around 4 times greater than the case that the NA is 0.6. Thus according to the equation (1), when the NA is large such as the NA=0.85, the spherical aberration generated by the error of the thickness of the cover glass is great.

Similarly, in the multilayer optical disk, provided that the interlayer distance t between the adjacent layers is consistent, the larger the NA of the objective lens of the optical pickup device is, the greater the difference (the error ΔSA) of the spherical aberration is. For instance, the spherical aberration SA when the NA is 0.85 is around 4 times greater than the case that the NA is 0.6. Thus according to the equation (1), when the NA is large such as the NA=0.85, the difference of the spherical aberration between the information recording layers is great.

It is thus understood that the performance of the objective lens having a high NA is certainly influenced by the error of the spherical aberration so that the spherical aberration causes the degradation in reading accuracy, and hence it is necessary to compensate the spherical aberration to realize an optical disk having greater recording density by the objective lens having a high NA.

Accordingly, there are methods to detect so as to compensate the spherical aberration. For instance, Japanese Laid-Open Patent Application, No. 2000-171346 (Tokukai 2000-171346; published on Jun. 23, 2000) discloses an optical pickup device which detects so as to compensates the spherical aberration. The objectives of this optical pickup device are achieved through the use of the property such that light beam around the optical axis converges at a point which is different from a point where light beam surrounding the beam around the optical axis converges, when the light beam converges on the information recording layer of the optical disk.

According to the optical pickup device disclosed in the above-identified application, the light beam to be detected is divided into: a light beam around the optical axis; and a light beam surrounding the beam around the light axis, using an optical element such as a hologram. Then the drift of either one of the light beams from a predetermined convergence point on the information recording layer is detected when the spherical aberration occurs, and in accordance with the result of the detection, the spherical aberration is compensated so that it is possible to sufficiently reduce the diameter of the light beam converging on each of the information recording layers of the optical disk.

Incidentally, an optical recording medium has sections for recording information, etc., such as lands, grooves and pits. For being certainly captured by a light spot formed on the optical recording medium due to the projection of light beam, the widths of the lands, grooves and pits are formed so as to be narrower than the diameter of the optical spot.

Thus the light beam projected onto the optical recording medium is converted into reflected light including pieces of diffracted light which are of different degrees due to the presence of the lands, grooves and pits which are irregularities on the surface of the optical recording medium, so as to return to the objective lens which is a part of the optical convergence system in the optical pickup device. For instance, as illustrated in FIG. 6, the light reflected from the lands and grooves of the optical disk returns to the objective lens as two pieces of the diffracted light, which are of different degrees (0 degree light and ±1 degree light), being overlapped.

For this reason, when the reflected light returns to the objective lens of the optical convergence system as two pieces of the diffracted light with different degrees, i.e. 0 degree light and ±1 degree light, being overlapped, the intensity of the reflected light is decreased so that the sensitivity of detecting the spherical aberration occurring in the optical convergence system is degraded.

Moreover, to record and reproduce information in and from the optical recording medium, it is necessary to detect so as to compensate the spherical aberration even during information is recorded and reproduced in and from the optical recording medium.

However, a complicated controlling is required to detect so as to compensate the spherical aberration during the recording and reproduction of information in and from the optical recording medium, and hence it is difficult to properly detect the spherical aberration during the recording and reproduction of information in and from the optical recording medium.

SUMMARY OF THE INVENTION

The objective of the present invention is to provide (1) an aberration detecting method by which a spherical aberration occurring in an optical convergence system is detected in sensitive manner and (2) an optical recording and reproduction method and an optical recording and reproduction apparatus, which can be controlled in a simple manner, for detecting the spherical aberration using the method (1) so as to compensate the spherical aberration, even when information is recorded and reproduced in and from the optical recording medium.

To achieve the above-mentioned objective, an aberration detecting method in accordance with the present invention comprises the steps of: projecting a light beam, which has passed through an optical convergence system included in an optical pickup device, onto a flat area of an optical recording medium, and detecting an aberration occurring in the optical convergence system in accordance with the light beam reflected from the flat section.

Generally, an optical recording medium is arranged such that grooves, lands, and pits, which are necessary for recording and reproducing information, are formed thereon, and when the widths of the grooves, lands, and pits are narrower than the spot diameter of the projected light beam, the light beam which has been reflected includes sets of diffracted light (0 degree light, ±1 degree light, etc.) having different degrees, generated due to the presence of the grooves, lands and pits. The sets of diffracted light of this type deteriorate the sensitivity of detecting the aberration occurring in the optical convergence system as well as the luminous intensity of the light beam. In this case, the aberration is substantially a spherical aberration.

In the meantime, the light beam, reflected from a flat area of the optical recording medium and the flat area does not have grooves, lands, and pits thereon, only includes 0 degree light so that the deterioration of the luminous intensity as above can be prevented and the sensitivity of detecting the aberration occurring in the optical convergence system can be improved.

Thus, as in the arrangement above, the light beam reflected from the flat area of the optical recording medium is used for detecting the aberration occurring in the optical convergence system in the optical pickup device so that the sensitivity of detecting the aberration is improved.

An optical recording and reproduction method in accordance with the present invention is, to achieve the above-mentioned objective, arranged such that information is recorded and reproduced in and from an optical recording medium using an optical pickup device, said method comprising the steps of: projecting a light beam, which has passed through an optical convergence system included in an optical pickup device, onto a flat area of an optical recording medium, and detecting an aberration occurring in the optical convergence system in accordance with the light beam reflected from the flat section, wherein, when recording and reproducing information in and from the optical recording medium, a flat section on the optical recording medium is specified and then the light beam which has passed through the optical convergence system is projected onto the specified flat section, and an aberration occurring in the optical convergence system is detected in accordance with the light beam reflected from the flat section.

According to this arrangement, the flat section, used for detecting the aberration occurring in the optical convergence system, is specified and then the aberration occurring in the optical convergence system is detected, using the light beam reflected from the specified flat section. Therefore, even during the recording and reproduction of information in and from the optical recording medium, the aberration occurring in the optical convergence system can be detected easily and in a sensitive manner.

To achieve the above-identified objective, an optical recording and reproduction apparatus in accordance with the present invention comprises: an optical pickup device for optical recording and reproducing of information in and from an optical recording medium; aberration detection means for projecting a light beam, which has passed through an optical convergence system provided in the optical pickup device, onto the optical recording medium, so as to detect an aberration occurring in the optical convergence system using the light beam reflected from the optical recording medium; and flat section specification means for specifying a flat section existing on the optical recording medium, the aberration detection means detecting the aberration according to the light beam reflected from the flat section which has specified by the flat section specification means.

According to this arrangement, during the recording and reproduction of information in and from the optical recording medium, the aberration detection circuit can detect the aberration in a sensitive manner, since the detection is carried out using the light beam reflected from the flat section in the optical recording medium, i.e. the reflected light beam on which the diffracted light rarely influences.

For a fuller understanding of the nature and advantages of the invention, reference should be made to the ensuing detailed description taken in conjunction with the accompanying drawings.

DESCRIPTION OF THE EMBODIMENTS

The following description will discuss an embodiment in accordance with the present invention. In this embodiment, what will be described is an example that: (1) an aberration detecting method for detecting a spherical aberration occurring in an optical convergence system constituting an optical pickup device; and (2) an optical recording and reproduction method using the method (1) are applied to an optical recording and reproduction apparatus provided with the optical pickup device.

Figure 1:
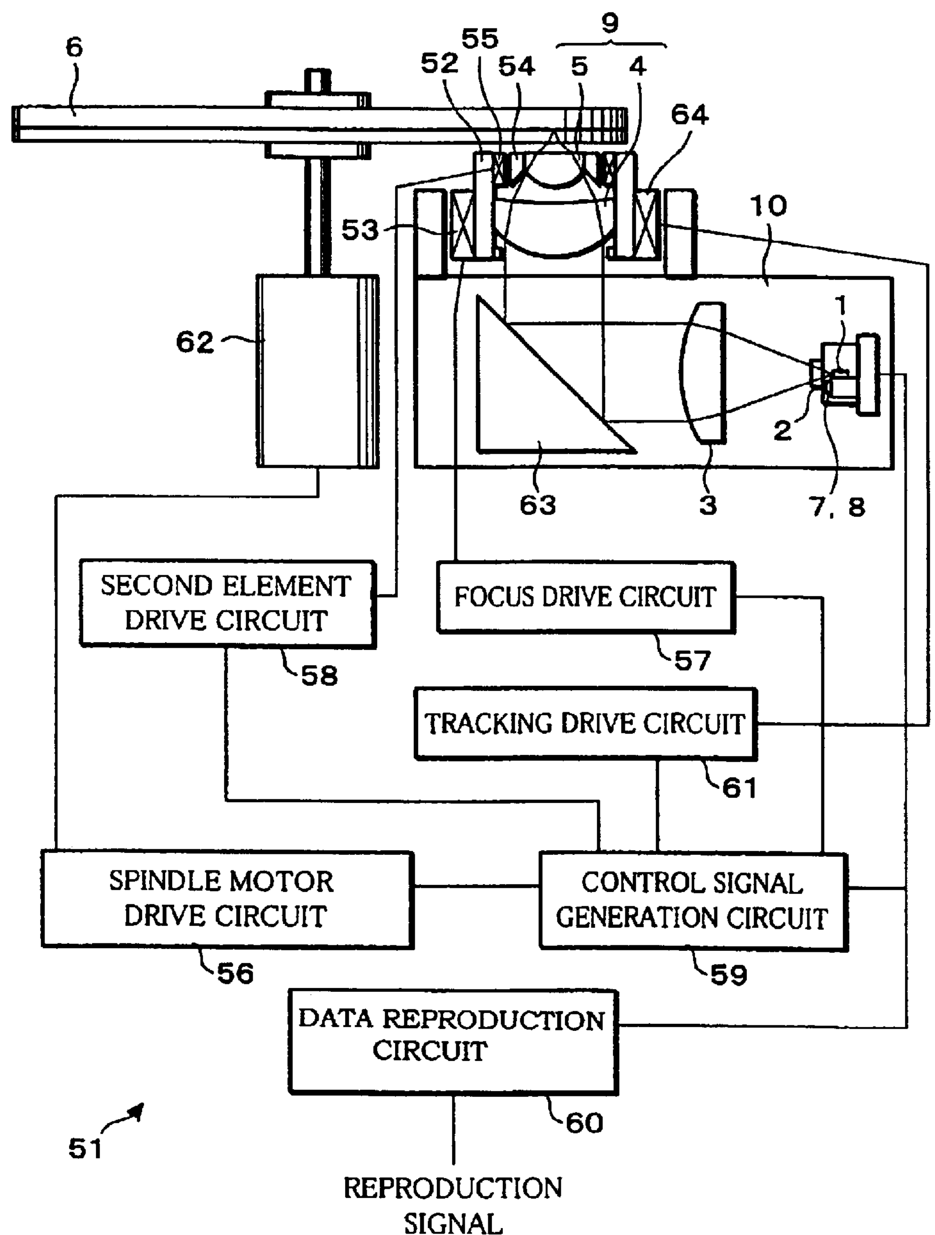
FIG. 1 is a brief block diagram illustrating an optical recording and reproduction apparatus in accordance with the present invention.

An optical recording and reproduction apparatus in accordance with the present invention includes, as illustrated in FIG. 1, a spindle motor 62 for rotary-driving an optical disk 6 which is an optical recording medium, an optical pickup device 10 for recording and reproducing information in and from the optical disk 6, and a drive control section 51 for controlling the drive of the spindle motor 62 and the optical pickup device 10.

The optical pickup device 10 is constituted by a semiconductor laser 1 as a light source to project light beam onto the optical disk 6, a hologram 2, a collimate lens 3, a two-element objective lens 9, and detecting devices 7 and 8.

Moreover, between the two-element objective lens 9 and the collimate lens 3, a mirror 63 is provided to bend the light beam from the two-element lens 9 or the optical path of the light beam from the collimate lens 3 into a more or less 90° degree.

Furthermore, the two-element lens 9 includes a first lens element 4 and a second lens element 5 being arranged in this order in the direction of the projection of the light beam from the semiconductor laser 1.

The first lens element 4 is supported by a holder 52 in the peripheral area of the element. In the rim of the holder 52, a focus actuator 53 and a tracking actuator 64 are provided.

By the focus actuator 53, the two-element objective lens 9 is moved to a proper position in the direction of the optical axis, so that the focus is controlled. Meanwhile, the tracking actuator 64 moves the two-element objective lens 9 in the radial direction (the direction of tracks formed on the optical disk 6, in other words the direction orthogonal to the optical axis) so that the tracking is controlled.

The drive of the tracking actuator 64 is precisely controlled so that the light beam is accurately tracked on a information track of the optical disk 6.

The second lens element 5 is supported by a holder 54 in the rim of the element 5. On the inner surface of the holder 52 facing the outer surface of the holder 54, a second element actuator 55 is provided for moving the second lens element 5 in the direction of the optical axis. The drive of this second element actuator 55 is controlled so that the space between the first lens element 4 and the second lens element 5 is regulated and the spherical aberration occurring in the optical convergence system of the optical pickup device 10 is compensated.

The drive control section 51 includes: a spindle motor drive circuit 56 for controlling the drive of the spindle motor 62; a focus drive circuit 57 for controlling the drive of the focus actuator 53; a tracking drive circuit 61 for controlling the drive of the tracking actuator 64; and a second element drive circuit 58 for controlling the drive of the second element actuator 55, and further contains: a control signal generation circuit 59 for generating control signals, which is send to the control circuits above, from signals supplied from the detecting devices 7 and 8; and a information reproduction circuit 60 for reproducing the information recorded in the optical disk 6 so as to generate reproduction signals from signals supplied from the detecting circuits 7 and 8.

In accordance with the signals supplied from the detecting devices 7 and 8, the control signal generation circuit 59 generates a tracking error signal TES, a focus error signal FES, and a spherical aberration signal SAES so as to send: the tracking error signal TES to the tracking drive circuit 61; the focus error signal FES to the focus drive circuit 57; and the spherical aberration signal SAES to the second element drive circuit 58. In each of the drive circuits, the drive of the sections constituting the same is controlled in accordance with the corresponding supplied error signal.

For instance, when the focus error signal FES is supplied to the focus drive circuit 57, in accordance with the value of this signal, the two-element objective lens 9 is moved in the direction of the optical axis so that the drive of the focus actuator 53 is controlled to compensate the drift of the convergence point of the two-element objective lens 9.

In the meantime, when the spherical aberration signal SAES is supplied to the second element drive circuit 58, in accordance with the value of the signal, the second lens element 5 is moved in the direction of the optical axis so that the drive of the second element actuator 55 is controlled to compensate the spherical aberration occurring in the optical system of the optical pickup device 10. However, if the spherical aberration is compensated using a spherical aberration compensation mechanism, the space between the first lens element 4 and the second lens element 5 of the two-element objective lens 9 are fixed so that the spherical aberration is compensated in accordance with the value of the spherical aberration signal SAES supplied to the spherical aberration compensation mechanism.

Figure 2:
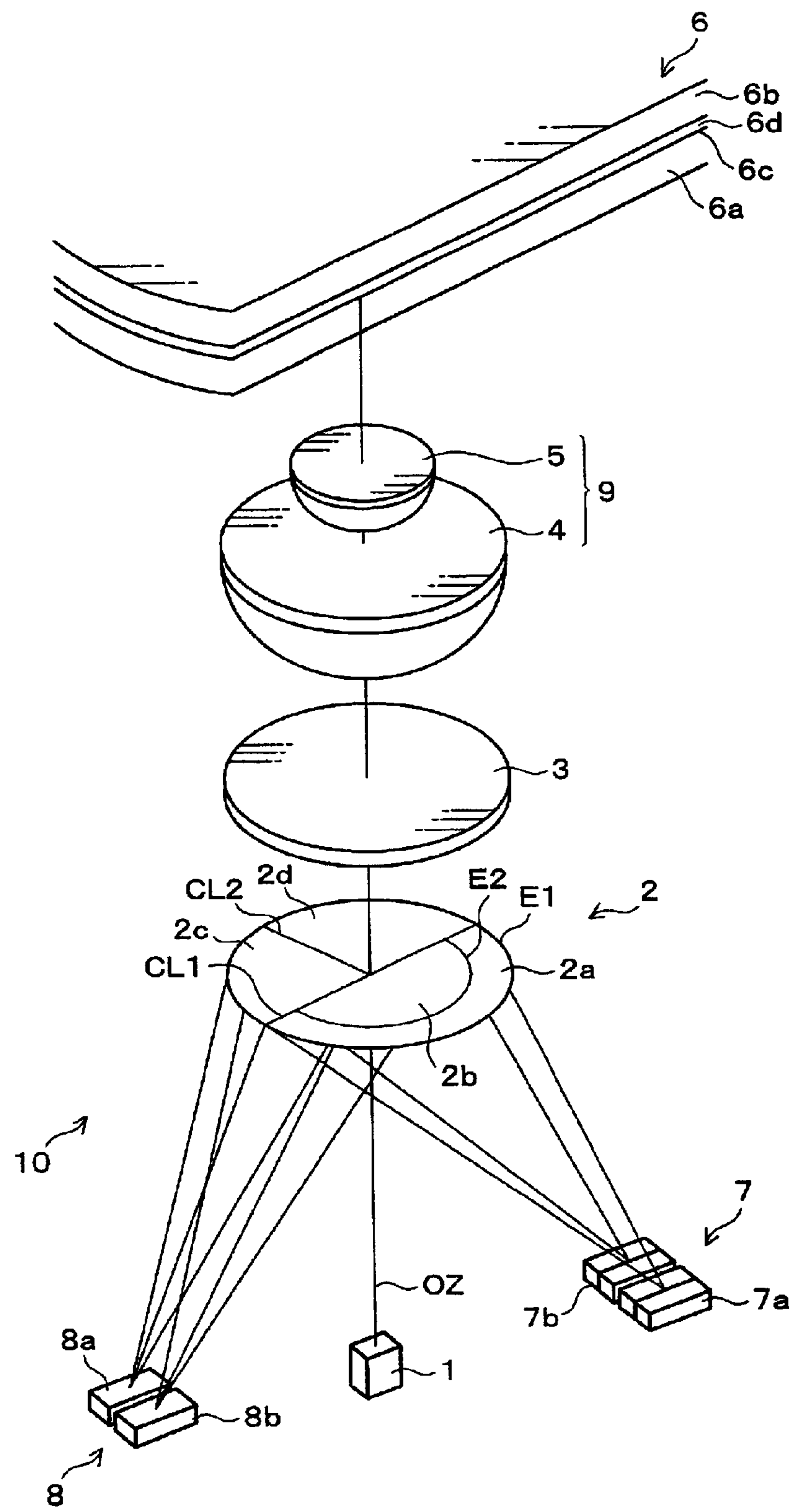
FIG. 2 is a block diagram illustrating an optical pickup device included in the optical recording and reproduction apparatus illustrated in FIG. 1.

Referring to FIG. 2, the optical pickup device 10 will be described in detail. Incidentally, in the optical pickup device 10 illustrated in FIG. 2, the mirror 63 illustrated in FIG. 1 is omitted for clarity.

The optical pickup device 10 is arranged such that the hologram 2, the collimate lens 3, and the first lens element 4 and the second lens element 5 constituting the two-element objective lens 9 are provided on an optical axis OZ formed between a light beam projecting face of the semiconductor laser 1 and a light beam reflecting face of the optical disk, and the detecting devices 7 and 8 are provided in places on which the diffracted light of the hologram 2 obtains focuses.

That is to say, in the optical pickup device 10 arranged as above, the light beam projected from the semiconductor laser 1 passes through the hologram 2 as 0 degree diffracted light, and after being converted into parallel beam by the collimate lens 3, the light passes through the two-element objective lens 9 constituted by the first lens element 4 and the second lens element 5 so as to converge on a information recording layer 6*c* or 6*d* in the optical disk 6.

In the meantime, the light beam, reflected from the information recording layer 6*c* or 6*d* in the optical disk 6, passes through the second lens element 5 and first lens element 4 of the two-element objective lens 9 and the collimate lens 3 in this order so as to be incident on the hologram 2 and diffracted therein, and then converges on the detecting devices 7 and 8.

The detecting device 7 includes a first acceptance section 7*a* and a second acceptance section 7*b*, and the detecting device 8 includes a third acceptance section 8*a* and a fourth acceptance section 8*b*. By these detecting devices 7 and 8, the light beam which has converged is converted to electric signals.

The optical disk 6 is constituted by a cover glass 6*a*, a substrate 6*b*, and two information recording layers 6*c* and 6*d* formed between the cover glass 6*a* and the substrate 6*b*. That is, the optical disk 6 is a two-layer disk, and the optical pickup device 10 is arranged such that the light beam converges on the information recording layer 6*c* or 6*d* so that information is reproduced from each of the information recording layers or recorded in each of the information recording layers.

Thus the information recording layer of the optical disk 6, hereinafter, indicates either of the information recording layers 6*c* and 6*d*, and the optical pickup device 10 can subject the light beam to converge on whichever one of the information recording layers so as to record and reproduce information.

The hologram 2 has 4 areas: 2*a*, 2*b*, 2*c*, and 2*d*.

The first area 2*a* is an area enclosed with a first straight line CL1 which is orthogonal to the optical axis OZ, a first circle E1, and a second arc E2, the first circle E1 and the second arc E2 having their center on the optical axis OZ.

The second area 2*b* is an area enclosed with the first straight line CL1 and the second arc E2.

The third area 2*c* and the fourth area 2*d* are provided on the rest of the surface of the hologram 2, the areas 2*c* and 2*d* being symmetrical with respect to a second straight line CL2 which is orthogonal to the first straight line CL1 as well as the optical axis OZ.

In the hologram 2, the light projected from the semiconductor laser 1 passes through the hologram 2 as 0 degree light and reaches the optical disk 6, and the reflected light from the optical disk 6 is diffracted so as to reach the detecting devices 7 and 8.

The hologram 2 is arranged such that, when the light beam coming from the optical disk 6 passes through the hologram 2, the light beam is diffracted so as to converge at different points corresponding to the areas above.

That is to say, the light beam reflected from the information recording layer of the optical disk 6 is divided into:

- a first light beam diffracted on the first area 2*a* of the hologram 2, forming a convergence spot on the first acceptance section 7*a* of the detecting device 7;
- a second light beam diffracted on the second area 2*b* of the hologram 2, forming a convergence spot on the second acceptance section 7*b* of the detecting device 7;
- a third light beam diffracted on the third area 2*c* of the hologram 2, forming a convergence spot on the third acceptance section 8*a* of the detecting device 8; and
- a fourth light beam diffracted on the fourth area 2*d* of the hologram 2, forming a convergence spot on the fourth acceptance section 8*b* of the detecting device 8.

Now, referring to FIG. 3, the detecting devices 7 and 8 will be described in detail as below.

Figure 3:
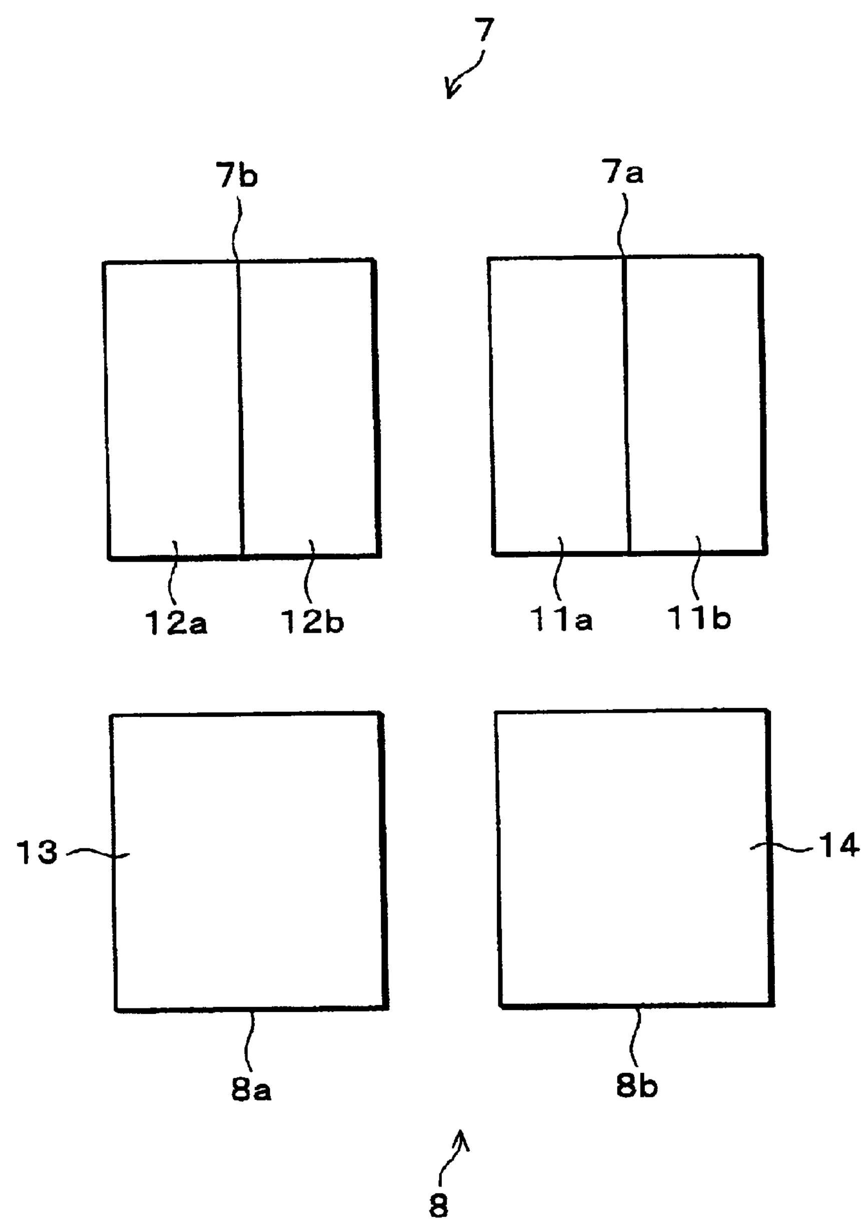
FIG. 3 is a block diagram illustrating a detecting device included in the optical recording and reproduction apparatus illustrated in FIG. 1.

As illustrated in FIG. 3, the detecting device 7 is composed of the above-identified two acceptance sections (the first acceptance section 7*a* and the second acceptance section 7*b*) being arranged side-by-side, meanwhile the detecting device 8 is composed of the above-identified two acceptance sections (the third acceptance section 8*a* and the fourth acceptance section 8*b*) being arranged side-by-side.

The first acceptance section 7*a* includes light detection devices 11*a* and 11*b* dividing the surface of the section 7*a* into two, meanwhile the second acceptance section 7*b* includes light detection devices 12*a* and 12*b* dividing the section 7*b* into two. Each the acceptance sections are arranged so that each of the convergence spots of the first and second light beams is formed on the line between the adjacent light detection devices, and the light beams are converted into electric signals.

The third acceptance section 8*a* includes a light detection device 13 whereas the fourth acceptance section 8*b* includes a light detection device 14, so that the third and fourth light beams are converted to electric signals.

The electric signals acquired in the light detection devices are used in the drive control section 51 (FIG. 1), for compensating the drift of the convergence point of the two-element objective lens 9 and reproducing the information recorded in the optical disk 6. For instance, the electric signals are supplied to the information reproduction circuit 60 (FIG. 1) so as to be converted into reproduction signals RF. In this case, the reproduction signals RF recorded in the optical disk 6 are equal to the sum total of electric signals supplied from all light detection devices.

The optical recording and reproduction apparatus as arranged above controls the drive of tracking to make the light beam, projected from the two-element objective lens 9, converge on a track formed on the optical disk 6, i.e. the tracking actuator 64 (FIG. 1) is driven and the two-element objective lens 9 is moved in the radial direction (the direction of the radius) of the optical disk 6, so that the light beam converges on the track.

Here, the tracking error signal TES, indicating an amount of the drift of the converged beam in the radial direction with respect to the track, can be represented as an equation (2), using electric signals 13S and 14S supplied from (i) a light detection device 13 of the third acceptance section 8*a* of the detecting device 8 and (ii) a light detection device 14 of the fourth acceptance section 8*b* respectively.

$$TES=13S-14S \quad (2)$$

The method of detecting the tracking error by calculating the tracking error signal TES using the equation (2) is realized thanks to the occurrence of an imbalanced reflection-diffraction light pattern in the radial direction due to the relationship between the track and the convergence spot, so as to be termed a push-pull method. Thus, to measure the amount of this imbalance, the second straight line CL2, which divides the third area 2*c* and the fourth area 2*d* of the hologram 2, is preferably orthogonal to the radial direction.

Using the electric signals from the light detection devices, the correction of the drift of the convergence point of the two-element objective lens 9 is conducted as below.

When the light beam does not come into focus on the information recording layer, in the first acceptance section 7*a* and second acceptance section 7*b* of the detecting device 7, the accepted light beam is mostly deflected to either one of the light detection devices.

Thus, a first focus error signal F1 is obtained by an equation (3) as below, wherein electric signals, from the light detection devices 11*a* and 11*b* which are for converting the diffracted light from the first area 2*a* in the hologram 2 into electric signals, are set as 11*a*S and 11*b*S respectively:

$$F1=11aS-11bS \quad (3)$$

whereas a second focus error signal F2 is obtained by an equation (4) below, wherein electric signals, supplied from the light detection devices 12*a* and 12*b* which are for converting the diffracted light from the second area 2*b* in the hologram 2 into electric signals, are set as 12*a*S and 12*b*S respectively:

$$F2=12aS-12bS \quad (4)$$

Based upon these equations, when the light beam does not come into focus on the information recording layer, the output values of the first and second focus error signals F1 and F2 are equal to the amount of the drift of the convergence point.

Therefore, to always keep the convergence point on the information recording layer, the two-element objective lens 9 is moved in the direction of the optical axis OZ so as to keep the outputs of first focus error signal F1 and the second focus error signal F2 to be zero.

The method of detecting the drift of the convergence point as above is commonly termed a knife-edge method. In this case, the drift of the convergence point is equal to the distance between a convergence point at which the light beam, which comes from the semiconductor laser 1 and passes through the two-element objective lens 9, is converged and positional information of the information recording layer of the optical disk 6.

Although the present embodiment describes the method of detecting the drift of the convergence point using the knife-edge method, the present invention is not limited to this knife-edge method so that a beam-size method, in which the drift of the convergence point is detected from the variation of the size of the beam around the convergence point, can be adopted as a method of detecting the drift of the convergence point.

The focus error signal FES is generally detected using all range of the effective diameter of the light beam, and thus in the present embodiment, the signal FES is calculated using the first focus error signal F1 and the second focus error signal F2 as below.

$$FES=F1+F2 \quad (5)$$

Then how to detect the spherical aberration occurring in the optical convergence system is described as below.

In the optical convergence system, a spherical aberration occurs owing to the change of the thickness of the cover glass 6*a* of the optical disk 6. When the spherical aberration occurs, an offset is generated in the focus error signal FES so that although the output of the detected focus error signal FES is zero, the light beam does not form the best image point on the information recording layer, and thus it is not possible to properly conduct the recording and reproduction of information.

Moreover, on account of the occurrence of the spherical aberration, the location of the convergence point of the inner section of the light beam and that of the outer section of the light beam are different. Thus the spherical aberration occurring in the optical convergence system can be detected by detecting the drift between the convergence point of the inner section of the light beam and that of the outer section of the light beam. In the present embodiment, the first focus error signal F1 and the second focus error signal F2 detect the drift of the convergence point in the inner section of the light beam and that of the outer section of the light beam respectively, so that an equation for generating a spherical aberration signal SAES is:

$$SAES=F1 \quad (6)$$

or $$SAES=F2 \quad (7)$$

and hence it is possible to detect the drift either from the first focus error signal F1 or the second focus error signal F2.

However, if the spherical aberration and the drift of the convergence point occur simultaneously, the first focus error signal F1 or the second focus error signal F2, either of them signifying the spherical aberration signal, is varied on account of the drift of the convergence point so that the spherical aberration cannot be properly detected.

Thus to detect the spherical aberration, it is necessary to minimize the effect of the drift, therefore the spherical aberration signal SAES is generated as:

$$SAES=F1-(F1+F2)\times K1 (K1 \text{ is a modulus}) \quad (8)$$

or $$SAES=F2-(F1+F2)\times K2 (K2 \text{ is a modulus}) \quad (9)$$

In these equations, the constant numbers K1 and K2 are determined to keep the variation of SAES small even if the drift of the convergence point occurs.

Although the present invention adopts the knife-edge method to detect the spherical aberration, it is possible to adopt other methods such as the beam-size method to detect the spherical aberration. Moreover, a preferable arrangement for detecting the spherical aberration in the most sensitive manner is such that the diameter of the second arc E2 on the hologram 2, the arc E2 being the borderline between the inner section and the outer section of the light beam, is determined to be substantially 70% of the effective diameter of the objective lens.

Using the above-identified method, the spherical aberration is detected so as to be compensated to reduce the same.

Although not illustrated, the optical disk 6 is provided with grooves, pits, and lands for recording and reproducing information, and the widths of the grooves, lands and pits are narrower than the spot diameter of the projected light beam.

Thus, the light beam, projected onto the optical disk 6 so as to be reflected from the information recording layer 6*c* or 6*d*, includes sets of diffracted light (0 degree light, ±1 degree light, etc.) having different degrees, generated by the grooves, lands and pits. When the sets of the diffracted light are superposed so as to return to the objective lens (two-element objective lens 9), the occurrence of the spherical aberration causes the variation of the diffracted light pattern where the 0 degree light and the ±1 degree light are superposed, so that the luminous intensity of the light beam becomes not uniformly distributed.

Thus the luminous intensity of the light beam varies in the inner section and the outer section of the light beam, and thus it becomes impossible to detect the spherical aberration precisely, when the spherical aberration is detected using either the inner section of the light beam or the outer section of the light beam. On this account, the sensitivity of the spherical aberration signal is degraded due to the diffracted light.

Thus, for detecting the spherical aberration precisely, it is necessary to detect the spherical aberration in a state of minimal influence from the diffracted light caused by the light beam being reflected from the information recording layer of the optical disk 6. To avoid the influence of the diffracted light, the detection of the spherical aberration is preferably conducted with respect to the light beam reflected from a flat area, from which the diffracted light is not generated so much, of the optical disk 6.

Figure 4:
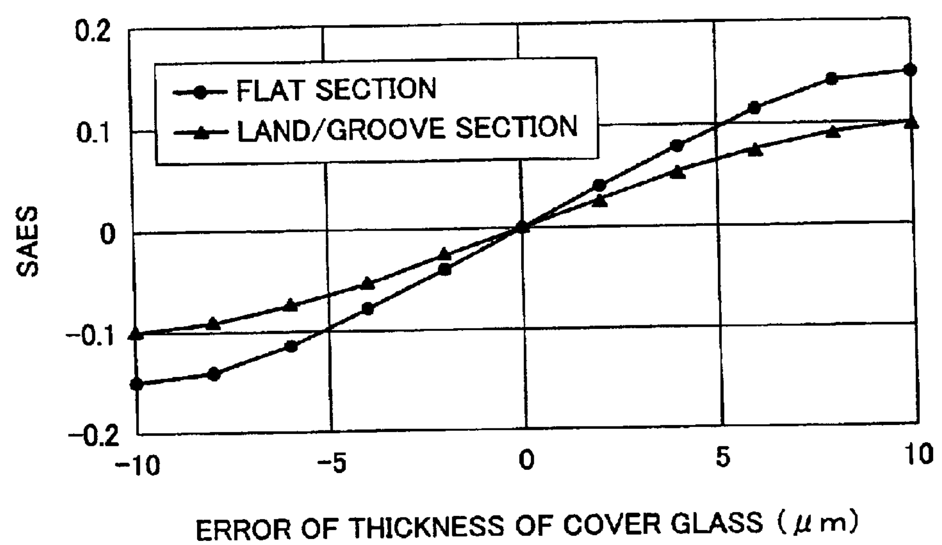
FIG. 4 is a graph indicating the variation of a spherical aberration signal due to the light beam reflected from a flat section of an optical disk and the light beam reflected from lands and grooves of the optical disk.

Now, FIG. 4 illustrates the relationship between the spherical aberration signal and the error of the thickness of the cover glass 6*a* of the optical disk 6, (i) in the case that the light beam is reflected from the flat section (flat section) of the optical disk 6 and (ii) in the case that the light beam is reflected from the lands or grooves of the optical disk 6.

A graph in FIG. 4 clearly shows that the spherical aberration signal SAES in the case (i) is more sensitive than the spherical aberration signal SAES in the case (ii). This proves that the spherical aberration signal SAES, reflected from the lands or grooves and greatly influenced by the diffracted light, has lower sensitivity.

On the contrary, in the light beam reflected from the flat section, the spherical aberration can be detected in a sensitive manner, as described above.

Figure 5:
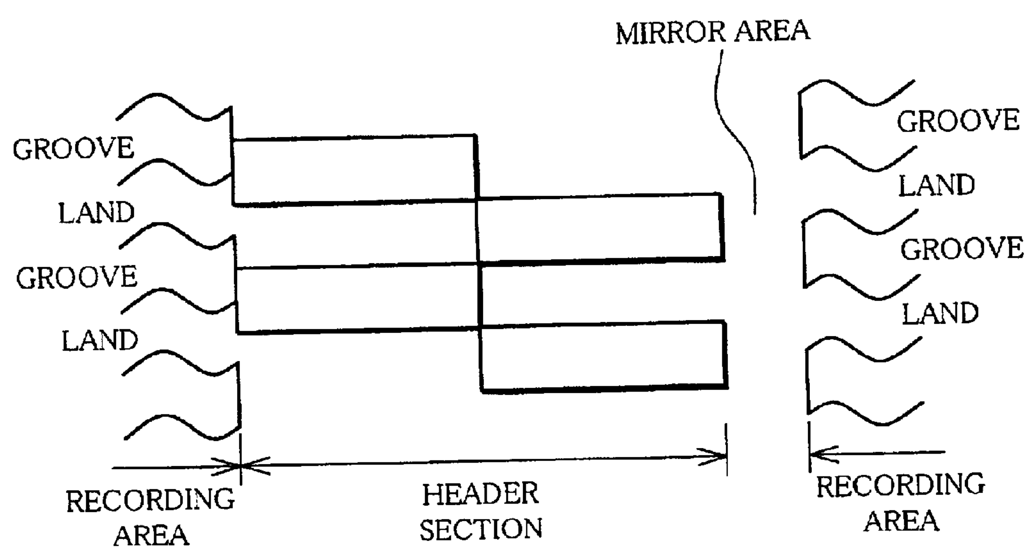
FIG. 5 illustrates a mirror section existing on a recording area of the optical disk.
Figure 6:
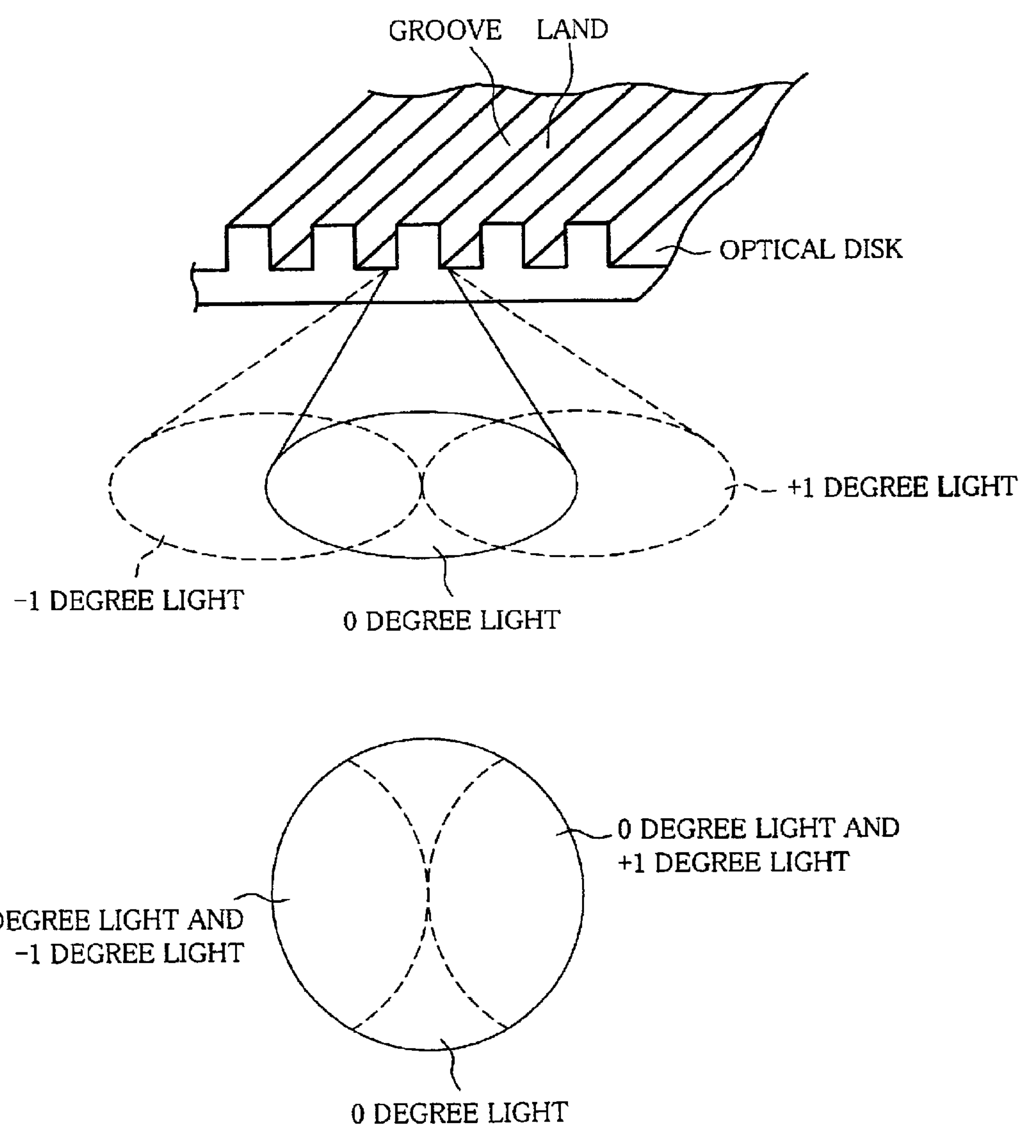
FIG. 6 illustrates how the light beam reflected from the lands and grooves of the optical disk generates diffracted light.

The flat section for detecting the spherical aberration may be arranged in an arbitrary location on the optical disk 6, or an existing flat area on the optical disk 6 may be utilized for detecting the spherical aberration. For instance, as FIG. 5 illustrates, it is possible to utilize: a mirror area provided between recording areas; and areas on the outermost section and the innermost section, the sections being without the lands, grooves and pits thereon, for the flat section for detecting the spherical aberration, as in the case of DVD-RAM. The spherical aberration can be detected in a sensitive manner when the light beam is reflected from the above-identified mirror area and the areas on which no lands, grooves or pits are formed.

Moreover, in the case of DVD-ROM, there is an area with pits thereon, the area being substantially regarded as a flat section as long as a track from which information is reproduced and tracks adjacent thereto have no pits. This kind of area can be utilized for the flat section for detecting the spherical aberration.

In this manner, to detect the spherical aberration in the light beam reflected from the flat section of the optical disk 6, it is necessary to confirm that the light beam is actually reflected from the flat section of the optical disk 6.

To confirm the reflection of the light beam on the flat section of the optical disk 6, there is a method such that, for instance, information for specifying the position of the flat section is recorded in the optical disk 6 in advance. For instance, the information for specifying the flat section utilized for detecting the spherical aberration can be recorded in a header section of the area for recording information in the optical disk 6. In this case, only reading the header section makes it possible to specify when the light beam is reflected from the flat section.

Furthermore, as another method to confirm the reflection of the light beam on the flat section of the optical disk 6, the reflection of the light beam is confirmed by specifying the flat section from the differences in reflection intensity on the optical disk 6.

For instance, the intensity of the reflected light beam with no diffracted light is stronger than the intensity of the light beam including the diffracted light. That is to say, the light beam reflected from the flat section of the optical disk 6 includes substantially no diffracted light so that this light beam is more intense than the light beam reflected from the lands, grooves or pits. Thus, if the reflection intensity of the light beam is stronger than a predetermined standard, the light beam is considered to be reflected from the flat section of the optical disk 6 so that the detection of the spherical aberration is carried out.

The above-identified method, in which the position of the flat section is specified so that the spherical aberration is detected in the light beam reflected from this specified flat section, can be used during the recording of information in the optical disk 6 and the reproduction of information from the optical disk 6, so that the method makes it possible to detect the spherical aberration in the light beam reflected from the flat section of the optical disk 6 in a sensitive manner, even when information is being recorded or reproduced.

Then the spherical aberration is compensated with reference to the detected spherical aberration signal so that the recording and reproduction of information is carried out with the light beam in a preferable state.

The optical recording and reproduction apparatus as arranged above operates as follows, when, for instance, the position of the flat section is specified by the reflection intensity of the light beam. In this example, the control signal generation circuit 59 functions as a flat section specification means for specifying the flat section of the optical disk 6.

The control signal generation circuit 59 in FIG. 1 monitors the reflection intensity, and if the reflection intensity surpasses a predetermined value, the spherical aberration signal SAES is supplied to the second element drive circuit 58. Then the drive of the second element drive circuit 58 is controlled in accordance with the supplied spherical aberration signal SAES, to compensate the spherical aberration occurring in the optical system of the optical pickup device 10.

This method for recognizing the reflection of the light beam on the mirror section of the optical disk 6 can be adopted for an optical disk having a plurality of information recording layers, and hence in this type of optical disk, it is possible to conduct the detection of the spherical aberration in the mirror section of each of the information recording layers.

Moreover, even if the diffracted light is generated, the spherical aberration may be detected when the diffracted light does not enter the effective diameter of the objective lens. In this case, although the intensity is weaken due to the generation of the diffracted light, the 0 degree light and the 1 degree light returning to the objective lens are not superposed so that the sensitivity of the spherical aberration signal SAES is not lowered by: the cross talk between the tracking error signal TES and the spherical aberration signal SAES due to the superposition of the sets of diffracted light; or the generation of interference band.

Also, since the amount of the spherical aberration is small when the error of the thickness of the cover glass, etc. is small, it is possible to adopt an arrangement such that the detection and compensation of the spherical aberration are carried out only when information is read out from the optical disk, while the above-identified detection and compensation are not carried out when information is recorded and reproduced. This method makes it possible to omit the complicated control system for detecting and compensating the spherical aberration during the recording and reproduction of information.

If the optical disk has a plurality of the information recording layers, the spherical aberration is detected so as to be compensated when the light beam jumps to one of the information recording layer, and the detection and the compensation of the spherical aberration are not carried out during the recording and reproduction of information. The detected amount of the spherical aberration being compensated is stored in storing means, and thus when the light beam jumps again to the information recording layer from which information has once been read out, the spherical aberration is compensated using the amount of the spherical aberration being compensated, which has been stored.

Means for compensating the spherical aberration using the spherical aberration detected by the above-identified detecting method is such as a compensation by regulating the distance between the first lens element 4 and the second lens element 5 of the two-element objective lens 9. However, the means is not particularly limited to this method, and thus, for instance, an arrangement such that the collimate lens 3 is moved so that the distance between the semiconductor laser 1 and the collimate lens 3 is regulated may be adopted. In this case, sets the light beam projected from the semiconductor laser 1 so as to pass through the collimate lens 3 are not parallel, and hence the spherical aberration occurs. Using this spherical aberration, it is possible to compensate the spherical aberration of the optical system of the optical pickup device.

Moreover, as spherical aberration compensation means, a spherical aberration compensation mechanism may be provided between the two-element objective lens 9 and the collimate lens 3. This spherical aberration compensation mechanism constitutes an optical system in which the spherical aberration occurs when the light beam passes through the spherical aberration compensation mechanism.

As the spherical aberration compensation mechanism, for instance, it is possible to adopt an a focal optical system in which a convex lens having a positive power and a concave lens having a negative power are combined. In this case the distance between these two lenses is regulated so that the spherical aberration which cancels out the spherical aberration occurring in the optical convergence system can be generated.

Incidentally, although the embodiment of the present invention describes an example when the present invention is adopted in the optical recording and reproduction apparatus, the present invention is not limited to this so as to be applicable for an optical reproduction apparatus which reproduces information recorded in an optical recording medium.

Moreover, the present invention can be adopted in optical recording and reproduction apparatuses and optical reproduction apparatuses such as: a DVD-ROM apparatus using DVD-ROM as the optical recording medium; a DVD-RAM apparatus using DVD-RAM as the optical recording medium; a CD-R/RW apparatus using CD-R/RW as the optical recording medium; an MD apparatus using an MD as the optical recording medium; and an MO apparatus using an MO as the optical recording medium.

As optical recording media, DVD-ROM and DVD-RAM have a plurality of recording layers or reproduction layers. In these cases, the flat section is specified in each of the layers and the spherical aberration occurring in the optical convergence system in the optical pickup device is detected using the light beam reflected from the specified flat section. Thus, the spherical aberration in each of the layers can be detected in a sensitive manner so that the recording and reproduction of information can be properly carried out.

Accordingly, an aberration detecting method in accordance with the present invention comprises the steps of: projecting a light beam, which has passed through an optical convergence system included in an optical pickup device, onto a flat area of an optical recording medium, and detecting an aberration occurring in the optical convergence system in accordance with the light beam reflected from the flat section.

Thus, the light beam reflected from the flat area of the optical recording medium is used for detecting the aberration occurring in the optical convergence system in the optical pickup device so that the sensitivity of detecting the aberration is improved.

The flat area may be a flat area existing either in a reproduction area or between recording areas of the optical recording medium.

In this case, on the flat area existing either in the reproduction area or in the area between the recording areas, the light beam is reflected with small influence from the grooves, lands, and pits, so that the aberration is detected with a minimum influence of the diffracted light, and as a result the detection of the aberration can be carried out in a sensitive manner.

The flat area may be a flat area existing either in an innermost section of the optical recording medium or in an outermost section of the optical recording medium.

In this case, the flat area, existing either in the innermost section or in the outermost section of the optical recording medium, has no grooves, lands, and pits so that the light beam is not affected by the diffracted light from the lands, grooves, and pits, and hence the sensitivity of the detection of the aberration in this case is better than the sensitivity in the above-identified case in which the light, reflected from the flat area existing either in the reproduction area or between the recording areas, is utilized.

Moreover, the flat area may be specified according to an amount of the light beam reflected from the optical recording medium.

In this case, the flat area of the optical recording medium can be specified by the amount of the reflected light so that it becomes unnecessary to specify the flat area in advance.

Thus, only after the flat area is specified by the amount of the reflected light, the detection of the aberration is conducted using this reflected light so that the detection of the aberration can always be carried out in a sensitive manner.

An optical recording and reproduction method in accordance with the present invention is, as described above, arranged such that information is recorded and reproduced in and from an optical recording medium using an optical pickup device, said method comprising the steps of: projecting a light beam, which has passed through an optical convergence system included in an optical pickup device, onto a flat area of an optical recording medium, and detecting an aberration occurring in the optical convergence system in accordance with the light beam reflected from the flat section, wherein, when recording and reproducing information in and from the optical recording medium, a flat section on the optical recording medium is specified and then the light beam which has passed through the optical convergence system is projected onto the specified flat section, and an aberration occurring in the optical convergence system is detected in accordance with the light beam reflected from the flat section.

Thus, the flat section, used for detecting the aberration occurring in the optical convergence system, is specified and then the aberration occurring in the optical convergence system is detected using the light beam reflected from the specified flat section. Therefore, even during the recording and reproduction of information in and from the optical recording medium, the aberration occurring in the optical convergence system can be detected easily and in a sensitive manner, without adopting any complicated controlling method.

The flat section may be specified either in a reproduction area or in an area between recording areas of the optical recording medium.

In his case, on the flat area existing either in the reproduction area or in the area between the recording areas, the light beam is reflected with small influence from the grooves, lands, and pits, so that the aberration is detected with a minimum influence of the diffracted light, and as a result the detection of the aberration can be carried out in a sensitive manner.

The flat section may be specified either in an innermost section of the optical recording medium or in an outermost section of the optical recording medium.

In this case, the flat section, specified either in the innermost section or in the outermost section of the optical recording medium, has no grooves, lands, and pits so that the light beam is not affected by the diffracted light from the lands, grooves, and pits, and hence the sensitivity of the detection of the aberration in this case is better than the sensitivity in the above-identified case in which the light, reflected from the flat area existing either in the reproduction area or between the recording areas, is utilized.

The flat area may be specified according to the luminous intensity of the light beam reflected from the optical recording medium.

In this case, existing devices such as the optical pickup device can be appropriated to evaluate the luminous intensity of the reflected light so that it is unnecessary to further provide an ad-hoc mechanism for specifying the flat section. On this account, it is possible to specify the flat section during the recording and reproduction of information in and from the optical recording medium, with a simple arrangement.

Positional information of the flat section existing on the optical recording medium may be recorded in a header area, of the optical recording medium, in which recording positional information or reproduction positional information of the optical recording medium is recorded.

In this case, the information of the position of the flat section is recorded in the header area which is always accessed at the time of recording and reproducing information in and from the optical recording medium, and hence this makes it possible to certainly specify the flat section during the recording and reproduction of information in and from the optical recording medium.

On this account, it is possible to detect the aberration occurring in the optical convergence system in a simple manner, during the recording and reproduction of information in and from the optical recording medium.

The optical recording medium may be arranged such that when a plurality of recording layers or a plurality of reproduction layers is included therein, the spherical aberration occurring in the optical convergence system is detected in each of the recording layers or in each of the reproduction layers.

In this case, it is possible to carry out the detection of the aberration in each of the recording layers or in each of the reproduction layers, in a sensitive manner. On this account, it is possible to carry out the detection of the aberration in a sensitive manner, even if, for instance, an optical recording medium having a plurality of recording layers or reproduction layers, such as a DVD-RAM and a DVD-ROM.

As described above, an optical recording and reproduction apparatus in accordance with the present invention comprises: an optical pickup device for optical recording and reproducing of information in and from an optical recording medium; aberration detection means for projecting a light beam, which has passed through an optical convergence system provided in the optical pickup device, on the optical recording medium, so as to detect an aberration occurring in the optical convergence system using the light beam reflected from the optical recording medium; and flat section specification means for specifying a flat section existing on the optical recording medium, the aberration detection means detecting the aberration according to the light beam reflected from the flat section which has specified by the flat section specification means.

According to this arrangement, during the recording and reproduction of information in and from the optical recording medium, the aberration detection means can detect the aberration in a sensitive manner, since the detection is carried out using the light beam reflected from the flat section in the optical recording medium, i.e. the reflected light beam on which the diffracted light rarely influences.

The flat section detection means may specify the flat section in either a reproduction area or an area between recording areas, all of the areas being included in the optical recording medium.

In this case, on the flat section existing either in the reproduction area or the area between the recording areas, the light beam is reflected with small influence from the grooves, lands, and pits, so that the aberration is detected with a minimum influence of the diffracted light, and as a result the detection of the aberration can be carried out in a sensitive manner.

The flat section specification means may specify the flat section either in an innermost section of the optical recording medium or in an outermost section of the optical recording medium.

In this case, the flat section, specified either in an innermost section or in an outermost section of the optical recording medium, has no grooves, lands, and pits so that the light beam is not affected by the diffracted light from the lands, grooves, and pits, and hence the sensitivity of the detection of the aberration in this case is better than the sensitivity in the above-identified case in which the light, reflected from the flat area existing either in the reproduction area or between the recording areas, is utilized.

The flat section specification means may specify the flat section according to the luminous intensity of the light beam reflected from the optical recording medium.

In this case, it is possible to specify the flat section during the recording and reproduction of information in and from the optical recording medium, without using an ad-hoc mechanism.

The invention being thus described, it will be obvious that the same may be varied in many ways. Such variations are not to be regarded as a departure from the spit and scope of the invention, and all such modifications as would be obvious to one skilled in the art intended to be included within the scope of the following claims.

What is claimed is:

1. An aberration detecting method, comprising the steps of:

projecting a light beam, which has passed through an optical convergence system included in an optical pickup device, onto a flat section of an optical recording medium, and detecting an aberration occurring in the optical convergence system in accordance with the light beam reflected from the flat section.

2. The aberration detecting method as defined in claim 1, wherein the flat section exists either between reproduction areas or between recording areas of the optical recording medium.

3. The aberration detecting method as defined in claim 1, wherein the flat section exists either in an innermost section of the optical recording medium or in an outermost section of the optical recording medium.

4. The aberration detecting method as defined in claim 1, wherein the flat section is specified according to an amount of the light beam reflected from the optical recording medium.

5. An optical recording and reproduction method, wherein, information is recorded and reproduced in and from an optical recording medium using an optical pickup device, said method comprising the steps of:

projecting a light beam, which has passed through an optical convergence system included in an optical pickup device, onto a flat section of an optical recording medium; and detecting an aberration occurring in the optical convergence system in accordance with the light beam reflected from the flat section, wherein, when recording and reproducing information in and from the optical recording medium, a flat section on the optical recording medium is specified and then the light beam which has passed through the optical convergence system is projected onto the specified flat section, and an aberration occurring in the optical convergence system is detected in accordance with the light beam reflected from the flat section.

6. The optical recording and reproduction method as defined in claim 5, wherein the flat section is specified either between reproduction areas or between recording areas of the optical recording medium.

7. The optical recording and reproduction method as defined in claim 5, wherein the flat section is specified in either an innermost section of the optical recording medium or an outermost section of the optical recording medium.

8. The optical recording and reproduction method as defined in claim 5, wherein the flat section is specified according to an intensity of the light beam reflected from the optical recording medium.

9. The optical recording and reproduction method as defined in claim 5, wherein positional information of the flat section existing on the optical recording medium is recorded in a header area, of the optical recording medium, in which recording positional information or reproduction positional information of the optical recording medium is recorded.

10. The optical recording and reproduction method as defined in claim 5, wherein, when the optical recording medium has a plurality of recording layers or a plurality of reproduction layers, the aberration occurring in the optical convergence system is detected in each of the recording layers or in each of the reproduction layers.

11. An optical recording and reproduction apparatus, comprising:

an optical pickup device for optical recording and reproducing of information in and from an optical recording medium;

aberration detection means for projecting a light beam, which has passed through an optical convergence system provided in the optical pickup device, onto the optical recording medium, so as to detect an aberration occurring in the optical convergence system using the light beam reflected from the optical recording medium; and flat section specification means for specifying a flat section existing on the optical recording medium, the aberration detection means detecting the aberration according to the light beam reflected from the flat section which has been specified by the flat section specification means.

12. The optical recording and reproduction apparatus as defined in claim 11, wherein the flat section specification means specifies the flat section either between reproduction areas or between recording areas of the optical recording medium.

13. The optical recording and reproduction apparatus as defined in claim 11, wherein the flat section specification means specifies the flat section in an innermost section of the optical recording medium or an outermost section of the optical recording medium.

14. The optical recording and reproduction apparatus as defined in claim 11, wherein the flat section specification means specifies the flat section according to an intensity of the light beam reflected from the optical recording medium.

* * * * *